(No Model.)

A. C. VAUGHAN.
NUT LOCK.

No. 337,801. Patented Mar. 9, 1886.

WITNESSES:
W. W. Hollingsworth
Edw. W. Byrn

INVENTOR:
A. C. Vaughan
BY Munn & Co.
ATTORNEYS.

UNITED STATES PATENT OFFICE.

AARON C. VAUGHAN, OF SHANE'S CROSSING, OHIO, ASSIGNOR OF ONE-HALF TO JAMES HERVEY STERNBERGH, OF READING, PA.

NUT-LOCK.

SPECIFICATION forming part of Letters Patent No. 337,801, dated March 9, 1886.

Application filed August 7, 1885. Serial No. 173,892. (No model.)

*To all whom it may concern:*

Be it known that I, AARON C. VAUGHAN, a citizen of the United States, residing at Shane's Crossing, in the county of Mercer and State of Ohio, have invented a new and useful Improvement in Nut-Locks, of which the following is a description.

Figure 1:
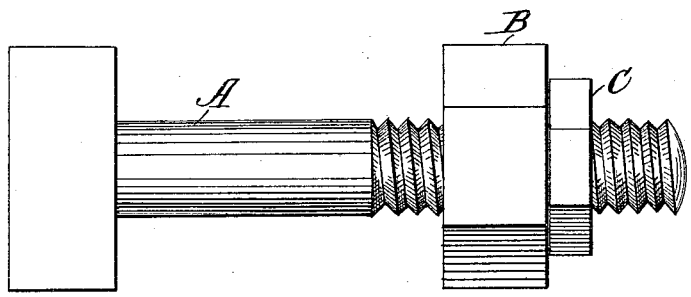
Figure 2:
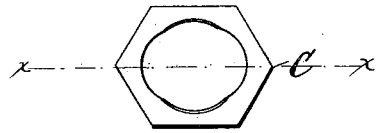
Figure 3:

Figure 1 is a side elevation of the nut-lock applied to a nut and bolt. Fig. 2 is a face view of the nut-lock, and Fig. 3 is a section of the same through the line $x\,x$.

The object of my invention is to provide a simple, practical, and inexpensive form of nut-lock for preventing a nut from accidentally turning off the threaded end of its bolt.

My invention is in the nature of a spring jam-nut to be applied to the threaded bolt just outside of the nut proper; and it consists in a ring or band of about one-third the thickness of an ordinary nut, and having an elongated perforation through it, the sides of the ring on the minor axis of which opening are formed with screw-threads that embrace the bolt, and the metal of which ring or band is so closely cut away by the perforation through it as to render it elastic, which causes its proximate threaded sides to clamp the bolt and hold on the nut, as hereinafter fully described.

In the drawings, A represents a bolt, B its nut, and C my improved nut-lock or jam-nut, which latter is made of steel or iron, and has an elongated hole through it that cuts away enough of the metal to leave but a thin elastic ring or band. The outer surface of the jam-nut as shown is hexagonal; but this is not essential, as it may be square, octagonal, or any other shape.

Upon the inner sides of the ring or band corresponding to the minor axis of the elongated opening, a regular screw-thread is cut, which tapers off gradually into the prolate ends of the elongated opening without a sharp shoulder, thus preventing the cutting or burying of the edges of these screw-threads into the metal of the bolt. After the threads are cut in the proximate sides of the ring, the latter is struck a blow on its sides to bring the two sets of threads a little closer together than the diameter of the bolt, so that they may have an elastic clamping effect in being turned on the bolt. Instead of cutting a regular straight thread in the ring and then slightly mashing its sides together, the same effect may be produced by making a tapered hole in the ring and cutting the threads on this taper, which makes one side of the opening across its minor axis a little wider than the other side, so that when the ring is turned on with the larger side of the opening next to the nut, the turning of the ring to place causes the narrow side of its opening to have the same elastic clamping effect.

I am aware that nut-locks have heretofore been provided which are in the nature of spring-collars having their two ends brought around into close juxtaposition, and that an inelastic nut with cut-away spaces or notches on its inner periphery is also old, and I lay no claim to these.

Having thus described my invention, what I claim as new is—

1. An elastic jam-nut consisting of a continuous elastic band or ring of metal having an elongated opening through the same, and its interior proximate side provided with screw-threads, substantially as shown and described.

2. An elastic jam-nut consisting of a continuous elastic band or ring of metal, having an elongated opening through the same, having a tapered screw-thread cut in its proximate inner sides, as and for the purpose described.

AARON C. VAUGHAN.

Witnesses:
J. S. RILEY,
J. J. ROBISON.